United States Patent
Browne et al.

(10) Patent No.: US 7,775,582 B2
(45) Date of Patent: Aug. 17, 2010

(54) PIVOTALLY DEPLOYABLE AIR DAM UTILIZING ACTIVE MATERIAL ACTUATION

(75) Inventors: Alan L. Browne, Grosse Pointe, MI (US); Kevin B. Rober, Washington, MI (US); Nancy L. Johnson, Northville, MI (US); James H. Brown, Costa Mesa, CA (US)

(73) Assignees: GM Global Technology Operations, Inc., Detroit, MI (US); Dynalloy, Inc., Costa Mesa, CA (US)

( * ) Notice: Subject to any disclaimer, the term of this patent is extended or adjusted under 35 U.S.C. 154(b) by 0 days.

(21) Appl. No.: 12/331,374

(22) Filed: Dec. 9, 2008

(65) Prior Publication Data

US 2010/0140976 A1   Jun. 10, 2010

(51) Int. Cl.
*B62D 35/00* (2006.01)
(52) U.S. Cl. .................. 296/180.1; 296/180.5; 296/217
(58) Field of Classification Search ............... 296/180.1, 296/91, 217, 108, 108.5; 180/903
See application file for complete search history.

(56) References Cited

U.S. PATENT DOCUMENTS

| | | | | |
|---|---|---|---|---|
| 4,131,308 A | * | 12/1978 | Holka et al. | 296/180.5 |
| 4,159,140 A | * | 6/1979 | Chabot et al. | 296/180.5 |
| 4,291,911 A | * | 9/1981 | Gallmeyer | 296/77.1 |
| 4,659,130 A | * | 4/1987 | Dimora et al. | 296/180.1 |
| 4,976,489 A | * | 12/1990 | Lovelace | 296/180.1 |
| 6,209,947 B1 | * | 4/2001 | Rundels et al. | 296/180.1 |
| 7,178,395 B2 | * | 2/2007 | Browne et al. | 73/170.11 |
| 2007/0216194 A1 | * | 9/2007 | Rober et al. | 296/180.1 |

* cited by examiner

*Primary Examiner*—Dennis H Pedder
*Assistant Examiner*—SunSurraye Westbrook (57) ABSTRACT

An active air dam adapted for use with a vehicle, includes a deflector pivotally translatable relative to the vehicle, so as to be caused to achieve stowed and deployed conditions, wherein the deflector, when in the deployed condition, is configured to occlude air flow beneath the vehicle, and further includes an active material actuator comprising an active material drivenly coupled to the deflector, and configured to cause the deflector to pivot to one of the stowed and deployed conditions as a result of activating the material, and the vehicle is preferably configured to cause the actuator to pivot the deflector when a pre-determined vehicle or external condition is detected.

16 Claims, 5 Drawing Sheets

PIVOTALLY DEPLOYABLE AIR DAM UTILIZING ACTIVE MATERIAL ACTUATION

BACKGROUND OF THE INVENTION

1. Technical Field

This disclosure generally relates to air dams and methods of deploying an air dam, and more particularly, to pivotally deployable air dams, and methods of manipulating the same that utilize active material actuation.

2. Background Art

Air dams have been developed to reduce the contribution of airflow under a moving vehicle to its aerodynamic drag. More particularly, air dams serve to redirect air flow that would otherwise pass underneath the vehicle, laterally, so as to minimize turbulence caused by irregular under-carriage surfaces. This redirection of airflow, it is appreciated, results in increased fuel efficiency for the vehicle. Air dams have traditionally presented fixed configurations, such as featured on race cars, which do not stow. Due to their proximity to the ground, however, conventional dams present various concerns in the art, such as for example, a propensity to become damaged (e.g., by scraping or coming in contact with foreign objects/the ground). Sporadic impact often permanently alters the shape of the dam thereby reducing its effectiveness. This further results in a reduction in useful life, and an increase in associative repair and/or replacement costs. As a result, vertically deployed air dams have more recently been developed, which enable variable ground clearance and thus selective usage and stowage when not in use. These dams, however, also present concerns in the art, among which include the need for complex mechanisms that seal the deployment actuator from outside elements, and provide non-binding laterally uniform motion.

BRIEF SUMMARY

In response to the afore-mentioned concerns, a pivotally deployable air dam that utilizes the benefits of active material actuation is presented herein. Among other things, the invention is useful for providing means of actuating the dam that is quieter (both acoustically and with respect to EMF) and less massive than counterpart electro-mechanical actuators.

Utility of invention includes the ability to reversibly stow the dam through remote actuation either on-demand or through control algorithms based on sensor input which reduces the likelihood of damaging the air dam in comparison to fixed models, and therefore expands upon the available applications of dams.

The pivotal construction of the dam results in more efficient means of sealing the actuator from external environments and foreign objects, such as road debris, snow and ice. Moreover, means of effecting non-binding motion is also simplified in comparison to linearly deployed dams. Additionally the pivot construction can minimize the damage to the air dam that might otherwise occur upon its striking an object as such contact produces a net lifting/stowing force acting on the pivoting air dam which pushes it upwards and out of contact.

The invention is further useful for increasing packaging flexibility, depending upon the location of the pivot point (and thus the required angle of rotation) and the lateral location of the pivot arms. Finally, it is appreciated that the use of active material actuation results in reduced implementation, maintenance and repair costs compared to counterpart electromechanically deployed systems.

A first aspect of the invention concerns an active air dam adapted for use with a vehicle. The dam includes a deflector coupled and pivotally translatable relative to the vehicle, so as to define a pivot axis, which enables the dam to achieve stowed and deployed conditions. The deflector, when in the deployed condition, is configured to occlude an air flow beneath the vehicle, when the vehicle is in motion. The dam further includes an active material actuator, wherein the actuator includes an active material operable to undergo a change in at least one fundamental property when exposed to an activation signal. The material is drivenly coupled to the deflector, such that the actuator is configured to exert a first force upon the deflector that causes the deflector to pivot to one of the stowed and deployed conditions as a result of the change.

A second aspect of the invention concerns a vehicle having an active air dam consistent with the fore-going, and further including a sensor operable to detect a vehicle or external condition, and a source operable to generate the signal, such that the material is exposed thereto. The sensor is intermediately and communicatively coupled to the actuator and source preferably through a controller, and configured to selectively cause the source to generate and deliver the signal, only when the condition is detected.

Other aspects and advantages of the present invention, including the employment of a cable or wire comprising shape memory material for actuating, and latching mechanisms for retaining the air dam will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION

Figure 1:
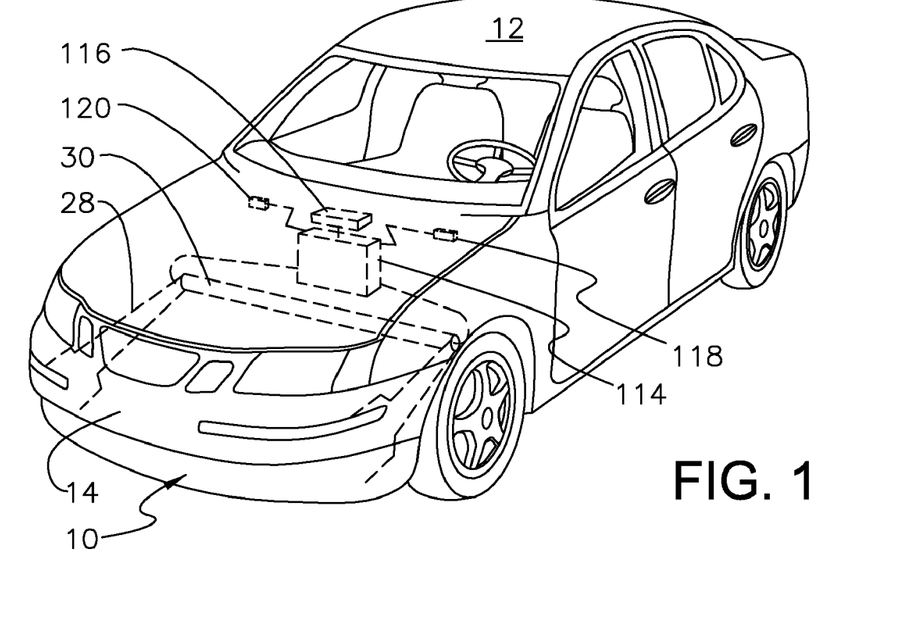
FIG. 1 is a perspective view of a vehicle employing an active air dam, in accordance with a preferred embodiment of the present invention.
Figure 2:
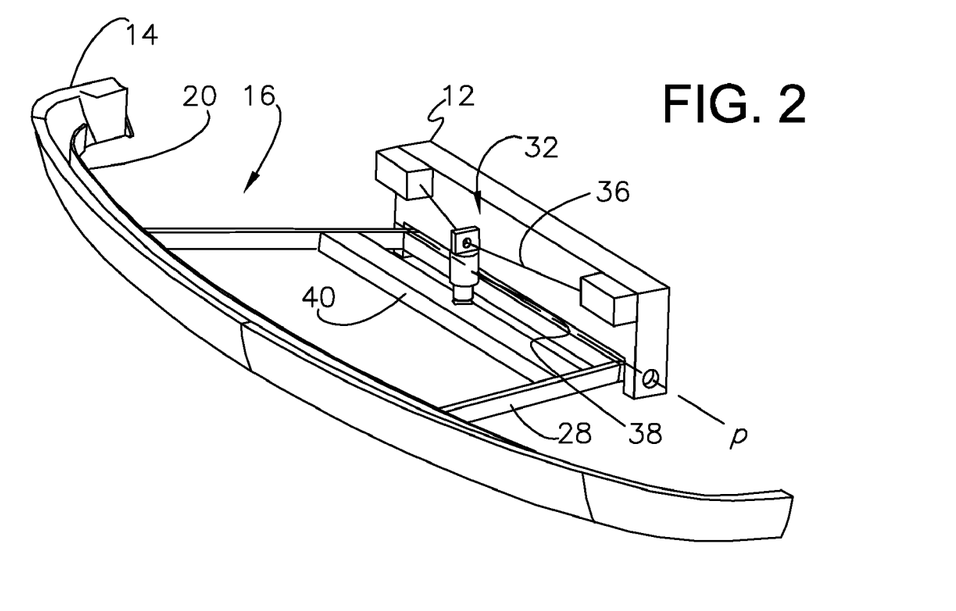
FIG. 2 is a perspective view of an air dam including first and second lateral pivot arms, and an active material actuator including a fastener and cable, in a stowed condition relative to a front bumper, in accordance with a preferred embodiment of the invention.
Figure 6:
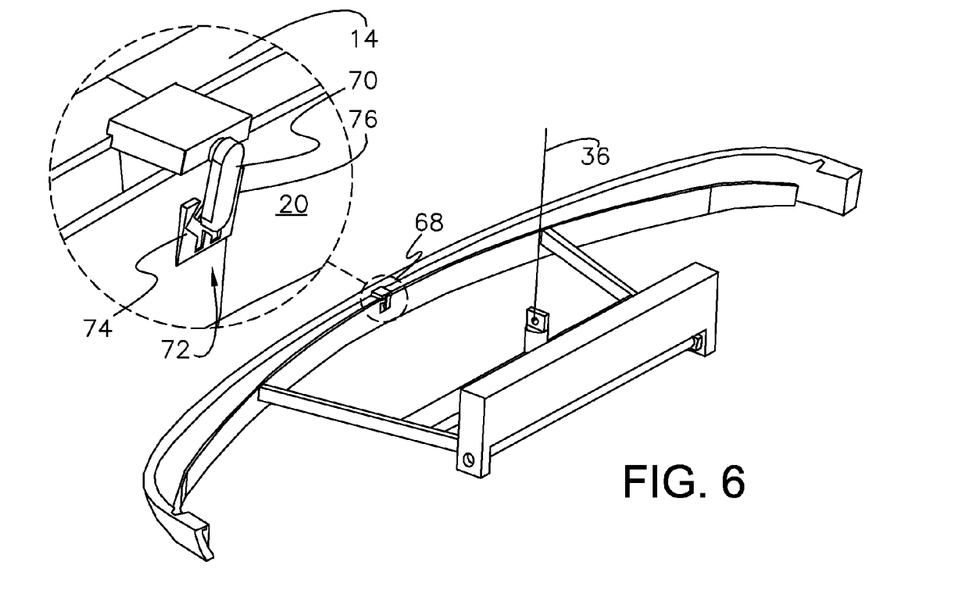
FIG. 6 is a rear perspective view of an air dam and bumper, particularly illustrating a pen latching mechanism, in accordance with a preferred embodiment of the invention.

As shown in FIGS. 1-10a, the present invention concerns pivotally deployable air dams 10 having active material actuation. In the illustrated embodiments, the air dam 10 is exemplarily employed by and utilized with respect to a vehicle 12, such as an automobile, truck, or SUV. The inventive air dam 10 is pivotal, relative to the remainder of the vehicle 12, between uppermost stowed and deployed conditions; and as such, is distinguishable from prior art active air dams that are linearly deployed. In the deployed condition (FIG. 1), it is appreciated that the dam 10 is operable to occlude and otherwise redirect air flow from underneath and towards the sides of the vehicle 12. As such, the dam 10 and vehicle 12 cooperatively present congruent lateral dimensions, and more preferably present superjacent layers in the stowed position. As shown in FIGS. 2 and 6, for example, the dam 10 may be configured to stow in a region arrear the front bumper or fascia 14 of the vehicle 12. The dam 10 and vehicle 12 are cooperatively configured such that the height of the dam 10 presents a preferred clearance relative to the ground or thoroughfare when in the fully deployed condition. In further regard to optimal performance, the lowermost profile of the air dam 10 is preferably horizontal, so as to result in uniform clearance across the width of the vehicle 12.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as shape memory alloys, and shape memory polymers. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's. Electrorheological (ER) compositions, magnetorheological (MR) compositions, dielectric elastomers, ionic polymer metal composites (IPMC), piezoelectric polymers, piezoelectric ceramics, various combinations of the foregoing materials, and the like may also be used.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Based on the configurations, actuation times of less than five seconds, an approximate lifetime of 100,000 actuations, and a working environment between −40 to 90° C. have been observed.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and JIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity— (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Active-Material PRV's, Methods, and Applications

Turning to the structural configuration of the invention, there are shown various embodiments of a pivotally deployable active air dam 10 (FIGS. 1 to 10a). FIG. 1 is a perspective view of a vehicle 12 employing an active air dam 10 with inner-workings of the invention shown in hidden-line type. The air dam 10 generally includes a deflector 16 coupled and pivotally translatable relative to the vehicle 12 between stowed and deployed conditions (compare FIGS. 3 and 3a). As such, the deflector 16 and vehicle 12 cooperatively define a main pivot axis, p.

Figure 10:
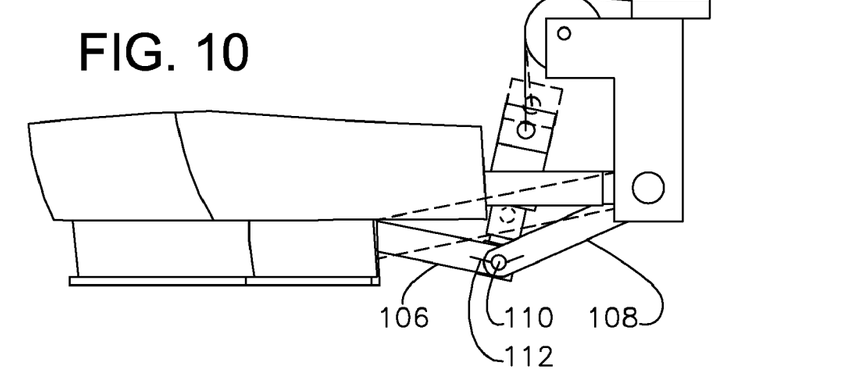
FIG. 10 is a side elevation of the bumper and dam shown in FIG. 9, particularly illustrating turnbuckle action (in hidden-line type), when the dam is prevented from rotating.
Figure 10A:
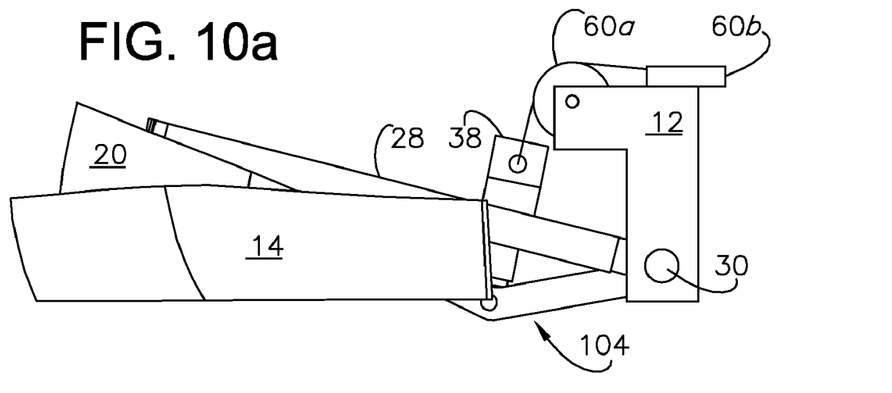
FIG. 10a is a side elevation of the bumper and dam shown in FIGS. 9 and 10, wherein the dam has been pivoted to the stowed condition.

In the fully stowed condition, the deflector 16 is preferably completely hidden from view, as best shown in FIG. 10a. When in the deployed condition, the deflector 16 is configured to occlude an air flow (not shown) beneath the vehicle 12, when the vehicle 12 is in motion. That is to say, the deflector 16 diverts air flow away from beneath and towards the lateral sides of the vehicle 12. The deflector 16 defines a lower edge, and in a preferred embodiment a longitudinally projecting distal lip 18 adjacent the lower edge (FIG. 3a). The lip 18 functions as an aerodynamic splitter in the deployed condition; and serves as an upward stop when stowing (FIGS. 3, 3a, and 12a).

Figure 3:
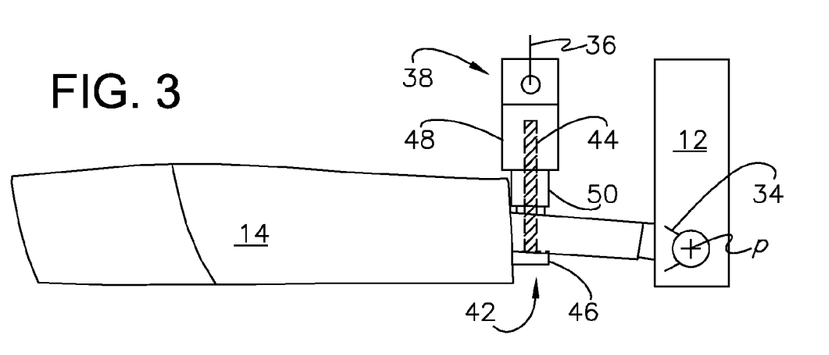
FIG. 3 is a side elevation of a front bumper and active air dam including a cable actuator, fastener, fastener adjustment element, and pivot arm, in accordance with a preferred embodiment of the invention.
Figure 3A:
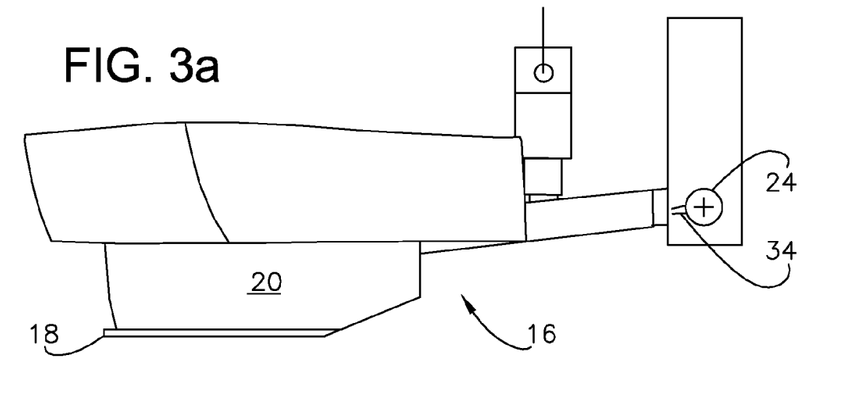
FIG. 3a is a side elevation of the air dam and bumper shown in FIG. 3, wherein the dam is in a deployed condition relative to the bumper.
Figure 5:
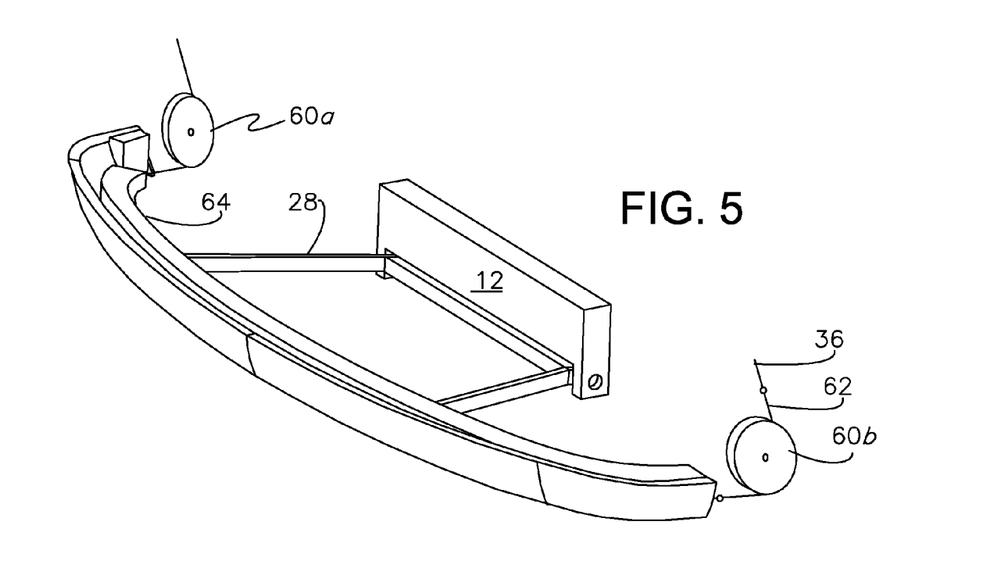
FIG. 5 is a perspective view of a front bumper and active air dam defining a race and including an active material actuator comprising a cable entrained within the race, and first and second lateral pulleys configured to redirect the force vector within the wire.
Figure 5A:
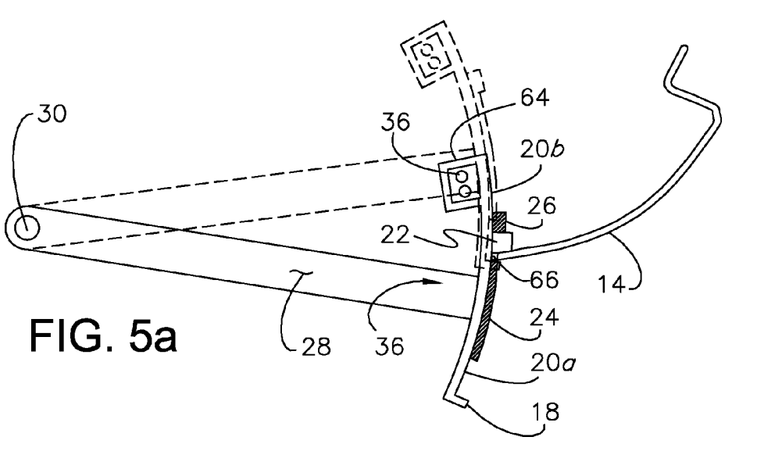
FIG. 5a is a side elevation of the air dam and front bumper shown in FIG. 5, particularly illustrating the race and wire.

In the illustrated embodiments, the deflector 16 includes a shielding member 20 preferably presenting a generally impermeable surface and curvilinear shape (FIGS. 3 and 5*a*). In a preferred embodiment, wherein the member 20 defines exposed and hidden sections 20*a,b* in the deployed condition, the exposed section 20*a* may be formed of a more flexible material, so as to elastically respond to impact (FIG. 5*a*), while the hidden section 20*b* remains rigid to provide structural support.

The deflector 16 and vehicle 12 preferably define a guide to promote non-binding motion and stability. For example, and as also shown in FIG. 5*a*, where the bumper 14 defines a guide (or groove) 22 adjacent the member 20, the member 20 defines a rib 24 configured to slide within the guide 22 during pivoting. As such, the deflector 16 is laterally secured by the rib 24 and guide 22 cooperatively. A stop 26 is presented at the top of the rib 24 and functions to limit the downward displacement of the member 20 (FIG. 5*a*).

The member 20 is pivotally connected to the vehicle 12 by at least one, and more preferably two pivot arms 28 interconnected by a pivot axle 30 (FIGS. 1 and 3). The pivot arms 28 preferably present lateral pivot points so as to facilitate packaging. As best shown in FIG. 5*a*, the member 20, in elevation, presents an arc of the circle defined by the radius resulting from the length of the pivot arms 28, so as to facilitate packaging. It is further appreciated that the angle of rotation and required moment (force) are both linearly dependent upon the radius.

The inventive dam 10 includes an active material actuator 32 comprising an active material as previously described in Part I. The material is drivenly coupled to the deflector 16, such that the actuator 32 is configured to exert a first force upon the deflector 16. The force causes the deflector 16 to pivot to one of the stowed and deployed conditions, as a result of the change (i.e., activating or deactivating the material). The actuator 32 preferably includes a biasing mechanism 34, such as a spring, that is also drivenly coupled to the deflector 16. The mechanism 34 is configured to exert a second force upon the deflector 16 less than and opposite to the first force, but greater than the force applied to the deflector 16 by the actuator 32 when the change is reversed. For example, the actuator 32 and mechanism 34 may be cooperatively configured such that the deflector 16 is caused to deploy, when the material is deactivated (FIG. 3*a*), and stow when activated (FIG. 3); or stow, when deactivated and deploy when activated. Alternatively, it is appreciated that gravity may supplant the mechanism 34, such that the weight of the deflector 16 causes it to selectively deploy.

In the illustrated embodiments, the actuator 32 includes a cable (e.g., wire, strip, braid, or other elongated structural element) 36 comprising a shape memory material, such as shape memory alloy or EAP; however, it is certainly within the ambit of the invention to utilize active material elements of other shapes and configurations, such as for example, a spring (not shown) defining differing activated and deactivated moduli, wherein the moduli are configured to store and deploy the deflector 16 respectively, or at least one torque tube comprising shape memory material. The cable 36 is configured to operably perform, and more particularly to cause the translation of the deflector 16 when activated or deactivated over the intended useful life of the air dam 10. Thus, where it is appreciated that deployment may frequently result, for example, whenever highway transit is performed, a suitable gauge of material is preferably selected. In one observation, a shape memory alloy wire presenting stress and strain values of 170 MPa and 2.5%, respectively, and between 2.5 to 12 V, and 2 amps of activation current are preferred.

The cable 36 may exemplarily define a linearly vertical (FIG. 3), horizontal (FIG. 9), bow-string (FIG. 2) or spooled (FIG. 4) configuration. For example, the cable 36 may be attached to the frame of the vehicle 12 at a fixed end, and to one of the pivot arms 28 through a structural fastener 38 at the other end (FIGS. 2 and 3). More preferably, the fastener 38 is attached to a crossbar 40 interconnecting the pivot arms 28 and spaced from the axle 30, as shown in FIG. 2. The preferred fastener 38 may present a crimp, flattened tube, or other device configured to increase the hold strength between the cable 36 and deflector 16. The fastener 38 includes an adjustment element 42 configured to change the height of the fastener 38, so as to adjust the position of the deflector 16 in the stowed or deployed condition. For example, the element 42 may present a threaded bolt 44 having a manually rotate-able knob 46, that when rotated changes the spacing between first and second fastener sections 48,50 (FIG. 3).

Figure 4:
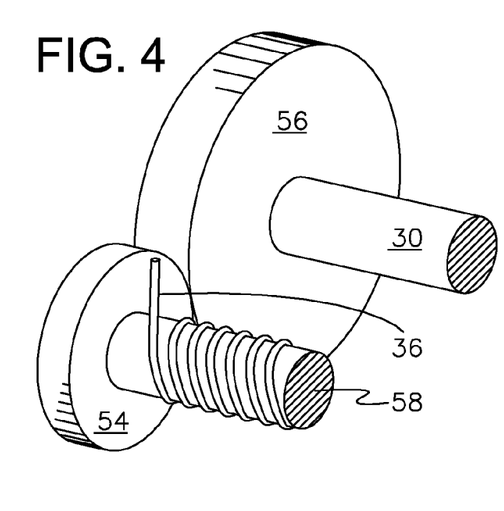
FIG. 4 is a partial perspective view of an active air dam actuator including a cable spooled about an axis, and compound gears configured to step up force versus displacement.
Figure 4A:
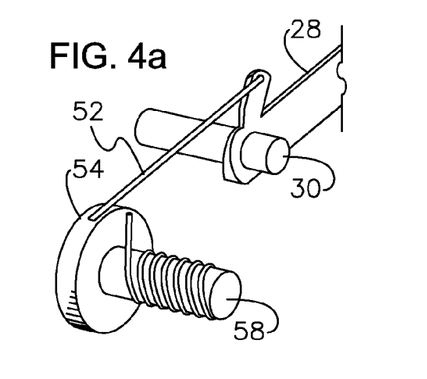

In one embodiment, and as shown in FIG. 4, the active material cable 36 may be spooled about and connected to the pivot axle 30. In this configuration, a change in the linear dimension of the cable 36 resulting from activation or deactivation of the material directly results in rotational displacement by the pivot axle 30, which thereby causes the deflector 16, which may be rigidly connected to the axle 30, to pivot. Alternatively, and as shown in FIG. 4*a*, the axle 30 may be coupled to a pivot arm 28 by a connector, such as a second cable 52. The cable 36 is connected to the arm 28 opposite the shielding member 20 relative to the axis, so as to present a lever. Mechanical advantage is preferably provided in the rotational displacements experienced by the member 20 and the connection point between the connector and arm 28, based on their relative spacing from the axis. Also shown in FIG. 4, first and second gears 54,56 may be caused to selectively engage a spooled shaft 58 and the pivot axle 30, and depending upon their relative diameters, be used to also provide mechanical advantage (i.e., a step up force versus displacement, or alternatively, displacement versus force).

As shown in FIGS. 5 and 9-10*a*, the actuator 32 may further include at least one, and more preferably a plurality of pulleys 60 that engage and entrain the cable 36, so as to redirect the force vector within the cable 36, pursuant to packaging concerns. That is to say, at least one pulley 60 can be used to navigate around obstacles (not shown), such as under-carriage conduits, structures and devices. For example, in FIG. 9, a second pulley 60*b* is used to redirect the vector towards a lateral orientation after longitudinally orienting the cable 36 with a first pulley 60*a*. In this configuration, the cable 36 preferably includes a pulley engaging section 62 formed of a more durable and/or friction reducing material, such as steel or a hard plastic, relative to the shape memory material. The section 62 may be coupled to the shape memory material by a connector (not shown).

In the embodiment shown in FIGS. 5 and 5*a*, wherein the shielding member 20 defines an upper edge, and a lateral race 64, the cable 36 may be entrained within the race 64, and caused to engage first and second lateral pulleys 60*a,b*. Each pulley 60 is configured to redirect the force vector within the cable 36 towards a vertically fixed point on the vehicle 12 (FIG. 5), so as to provide a vertical force for stowing. Alternatively, it is appreciated that the cable 36 may entrain the upper quadrant of each pulley 60, so as to be caused to run longitudinally therefrom. Finally, a sealing element 66, such as the elastic membrane inter-engaging the dam 10 and vehicle 12 (FIG. 5*a*) is preferably provided in order to ensure protection of actuator components.

To retain the deflector 16 in one of the stowed and deployed conditions, the preferred air dam 10 further includes a latching mechanism (i.e., "latch") 68 cooperatively defined by the deflector 16 and vehicle 12. The latch 68, it is appreciated, allows the cessation of power (e.g., activation signal) once the dam 10 achieves the desired deployed or stowed condition, and therefore provides the additional advantage of increased fuel economy and vehicle range. Alternatively, it is appreciated that a detent (not shown) can be used in lieu of or in addition to the latch 68, so as to further hold the air dam 10 in the deployed or stowed condition. The detent can be for example based on friction; or in another configuration present a partial mechanical interlock that necessitates higher forces to deform one or more elastic elements so as to disengage the mechanical interlock.

In FIG. 6, the mechanism 68 presents a ball-point-pen type latch including an engaging pin 70 coupled to and distending from the vehicle 12, and a contoured surface 72 attached to the deflector 16. That is to say, the pin 70 and surface 72 are cooperatively configured such that the surface 72 is caused to engage the pin 70 during a first upward translation; the surface 72 is configured such that the pin 70 becomes vertically secured by a first surface region 74 that has been caused to overhang the pin 70, as a result of the first translation; and during a sequential upward translation (e.g., caused by further activating the material), the pin 70 engages a second region 76 of the surface 72, which causes the pin 70 to swing over to a position wherein vertical translation by the deflector 16 is again enabled.

Figure 7:
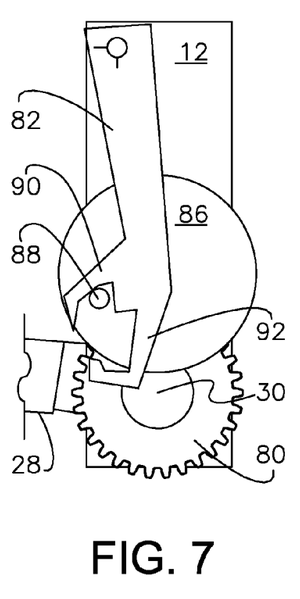
FIG. 7 is a side elevation of a front bumper and active air dam including a compound gear and swing arm latching mechanism, in accordance with a preferred embodiment.
Figure 7A:
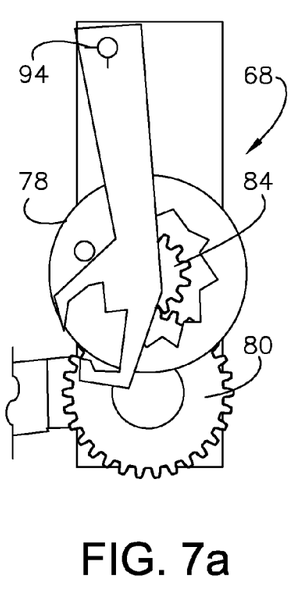
FIG. 7a is a side elevation of the bumper and dam shown in FIG. 7, wherein the swing arm is disengaged.

Alternatively, FIGS. 7 and 7a present an active air dam 10 including a compound gear and swing arm latching mechanism 68 in engaged and disengaged conditions. More particularly, in this configuration, the mechanism 68 includes upper and lower gears 78,80 and a swing arm 82 rotatably connected to the vehicle 12. The lower gear 80 is concentrically aligned, and fixedly attached, so as to rotate with the pivot axle 30. The upper gear 78 presents a compound configuration including a pinion 84 and an outer disk 86 having an engaging pin 88 integrally attached thereto. The operable diameters of the gears 78,80 are cooperatively configured to increase the angle of rotation of the pin 88 relative to that of the pivot axle 30. More particularly, the pin 88 is preferably caused to make a complete revolution, so as to selectively engage the arm 82 in one direction.

The swing arm 82 presents first and second prongs 90,92 that cooperatively define a concavity. The arm 82 is preferably biased, either by weight (e.g., positioning the pivot axis of the arm 82 off-center with respect to the engagement position of the pin 88) or by a torsion spring 94, in a clockwise direction. The pin 88 is caused to rotate in the counter-clockwise direction as the deflector 16 is stowed. Once locked in the engaged condition (FIG. 9), the pin 88 is unable to rotate in the reverse direction, even as the actuator 32 deactivates. An allowance, such as a slip clutch (not shown) within the drive train, allows the actuator 32 to reset while the deflector 16 remains latched in the desired condition. The air dam 10 is then deployable by releasing the latch 68, for example, by causing it to axially migrate a distance greater than the pin height. Once reset and deployed, the actuator 32 is able to again cause the deflector 16 to stow, and the pin 88 to rotate in the counter-clockwise direction until re-engaging the arm 82. The second prong 92 is provided to limit the ability of the deflector 16 to over-shoot the desired stowed condition.

Figure 8:
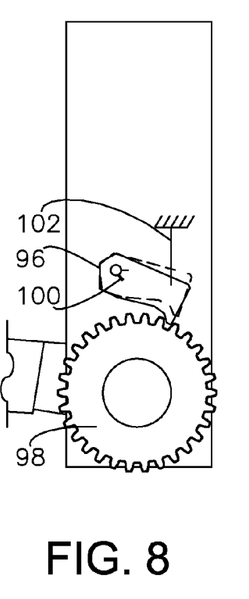
FIG. 8 is a side elevation of a front bumper and air dam including a pawl and ratchet based latching mechanism.

In the alternative latching configuration shown in FIG. 8, the air dam 10 includes a pawl 96 and ratchet 98. In this configuration, the ratchet 98 defines at least one and more preferably a plurality of teeth concentrically aligned with the main axis, p. The pawl 96 is biased towards engaging the ratchet 98, so as to selectively engage the teeth and prevent rotation by the ratchet 98 in one direction. For example, a torsion spring 100 may be coupled to the pawl 96 and configured to bias the pawl 96 towards engaging the ratchet 98, as shown in FIG. 8. It is appreciated that the latch 68, in this configuration, presents a plurality of intermittently adjustable positions that result in variable degrees of deployment.

In this configuration, the mechanism 68 includes a disengagement actuator 102 operable to cause the pawl 78 to selectively disengage the ratchet 98 so as to allow rotation in said one direction. More preferably, and like the main actuator 32, the disengagement actuator 102 also utilizes the benefits and advantages of active material actuation. For example, the actuator 102 may consist of a shape memory wire fixedly coupled to the vehicle 12 and pawl 96, as shown in FIG. 8. The wire 102 presents an activation force greater than the spring modulus of the spring 100, so as to cause the mechanism 68 to disengage and release the deflector 16, when activated. Alternatively, it is appreciated that the roles of the actuator 102 and spring 100 may be reversed; wherein the actuator 102 is configured to cause the pawl 96 to engage the ratchet 98 when activated, and the biasing spring 100 presents a spring modulus less than the activation force, so as to be configured to cause the pawl 96 to disengage and release the ratchet 98, only when the actuator 102 is deactivated. It is appreciated that the proximity to the pivot axis of the mechanism 68 results in a reduced need for sealing.

Finally, the preferred dam 10 includes a load limit protector 104 that provides strain/stress relief capability, and thereby increases the life of the actuator 32 (and/or to a lesser need the second actuator 102). In this regard, it is appreciated that when an active material undergoes transformation, but is prevented from undergoing the resultant physical change (e.g. heating a stretched SMA wire above its transformation temperature but not allowing the wire to revert to its unstressed state), detrimental affects to the materials performance and/or longevity can occur. In the present invention, for example, it is foreseeable that the deflector 16 could by constrained from moving when actuated, either by a foreign object or another form of impediment (e.g., a deformed body panel blocking motion or ice/mud build up). As such, to prevent damage to the actuator 32, a secondary output path to the triggered motion is preferably included, which allows the material to respond to the activation signal while the condition of deflector 16 remains unchanged.

Figure 9:
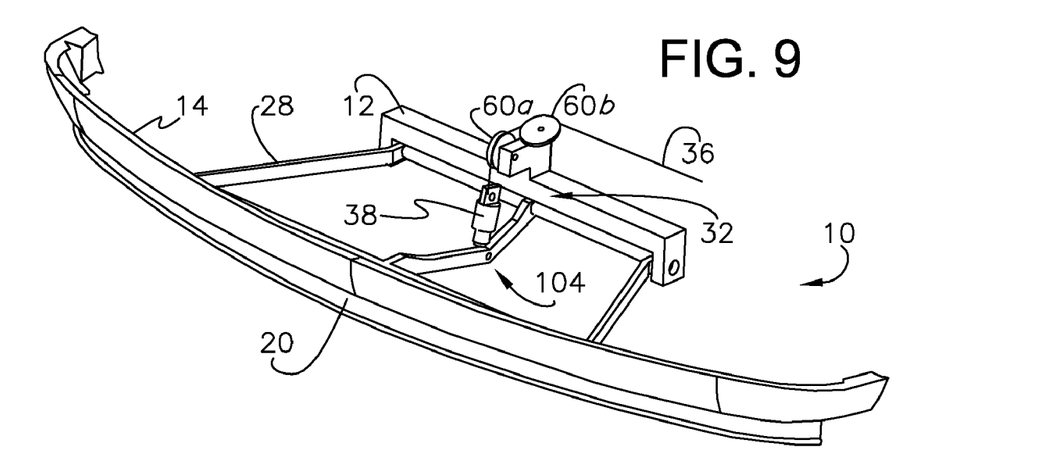
FIG. 9 is a perspective view of a front bumper and an air dam in a deployed condition, defining a turnbuckle pivot arm, and including an actuator connected to a turnbuckle and presenting a double pulley configuration, wherein the turnbuckle provides strain relief to the actuator, in accordance with a preferred embodiment of the invention.

In FIGS. 9-10a, the protector 104 is presented by a medially positioned turnbuckle that supplants the crossbar 40. The turnbuckle 104 includes first and second arm segments 106, 108 defining a pivotable joint 110 spaced from the main axis, p. The joint 110 is biased towards a normal condition, such as illustrated. For example, torsion springs 112 may be coupled to the joint 110 and distal end connections, so that the turnbuckle 104 is resistively reconfigurable. The actuator 32 engages the turnbuckle 104 at the joint 110, and is configured relative to the weight of the deflector 16, so as to cause the segments 106,108 to pivot, only when the deflector 16 is prevented from motion. FIG. 10 illustrates the stress relieving action of the turnbuckle 104 (in hidden-line type).

In operation, selective deployment of the air dam 10 may be effected by a controller 114 communicatively coupled to an activation signal source 116, such as the charging system of the vehicle 12 or otherwise power supply, and at least one sensor(s) and/or input device 118 (FIG. 1). The controller 114 may be preprogrammed to have the source 116 deliver the activation signal based on sensory input of a vehicle or external condition. For example, vehicle speed and yaw rate may be monitored by the sensor(s) 118 to indicate a predetermined vehicle condition (e.g., a speed greater than 50 mph on straight-aways, and 35 mph on curves), wherein it is desirous to deploy the air dam 10. Thus, other sensor input may include receiving telematics information from a GPS (or other positioning system) 120 having a map database (FIG. 1) to determine off road, local, or high-way navigation/positioning, and further include determining actuation of 4-wheel drive, detecting an obstacle or impending crash event, and determining (e.g., through sensory or communicative technology) a predetermined weather condition. Alternatively, the sensor 118 may directly interconnect the actuator 32 and source 116, and be configured to cause the source 116 to generate and deliver the signal, only when the condition is detected.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An active air dam adapted for use with a vehicle, said dam comprising:
   a deflector coupled and pivotally translatable relative to the vehicle, so as to define a pivot axis and achieve stowed and deployed conditions, wherein the deflector, when in the deployed condition, is configured to occlude an air flow beneath the vehicle, when the vehicle is in motion; and
   an active material actuator including an active material operable to undergo a change in at least one fundamental property when exposed to an activation signal, and drivenly coupled to the deflector, such that the actuator is configured to exert a first force upon the deflector that causes the deflector to pivot to one of the stowed and deployed conditions as a result of the change
   wherein the deflector includes at least one pivot arm defining the axis, the actuator includes a cable attached to the vehicle and a structural fastener interconnecting the arm and cable, the arm is caused to upwardly pivot, so that the deflector is caused to translate to the stowed condition by producing a force vector in the cable, and the deflector and vehicle cooperatively define a mechanism configured to retain the deflector in one of the stowed and deployed conditions, when the material is not exposed to the signal.

2. The dam as claimed in claim 1, wherein the material is selected from the group consisting essentially of shape memory alloys, ferromagnetic shape memory alloys, shape memory polymers, piezoelectric materials, electroactive polymers, magnetorheological fluids and elastomers, electrorheological fluids, and composites of the same.

3. The dam as claimed in claim 1, wherein the actuator includes a biasing spring drivenly coupled to the deflector, and configured to exert a second force upon the deflector less than and opposite to the first, and the material and spring are cooperatively configured such that the deflector is caused to translate to the other of said stowed and deployed conditions, when the material is not exposed to the signal.

4. The dam as claimed in claim 1, wherein the deflector defines a lower edge, and a distal lip adjacent the edge, and configured to present a splitter longitudinally oriented generally parallel to the flow when the deflector is in the deployed condition, and a stop that engages the vehicle when the deflector is in the stowed condition.

5. The dam as claimed in claim 1, wherein the cable presents a bow-string configuration.

6. The dam as claimed in claim 1, wherein the cable is spooled about and connected to the axis, so as to be configured to cause the deflector to pivot between the stowed and deployed conditions.

7. The dam as claimed in claim 1, wherein the actuator and deflector cooperatively present a load limiter configured to relieve strain in the material when the deflector is prevented from pivoting about the axis.

8. The dam as claimed in claim 7, wherein the deflector includes at least one pivot arm comprising first and second arm segments defining a pivotal joint spaced from the axis, so as to present a turnbuckle, the joint is biased towards a normal condition, and the actuator engages the arm at the joint, and is configured to cause the segments to relatively pivot only when the deflector is prevented from pivoting about the axis.

9. The dam as claimed in claim 1, wherein the cable comprises the material.

10. The dam as claimed in claim 1, wherein the actuator further includes at least one pulley secured relative to the vehicle and cable, and configured to entrain the cable, so as to change the direction of the vector.

11. The dam as claimed in claim 10, wherein the deflector defines an upper edge, and a lateral race adjacent the edge, the cable laterally extends within the race and is entrained by first and second pulleys, so as to present vertical sections adjacent the vehicle.

12. The dam as claimed in claim 1, wherein the fastener includes an adjustment element, and the element is configured to change the height of the fastener, so as to adjust the position of the deflector in the stowed or deployed condition.

13. The dam as claimed in claim 1, wherein the mechanism presents a pen latch including an engaging pin coupled to and distending from the vehicle, and a contoured surface attached to the deflector, and the pin and surface are cooperatively configured such that the surface is caused to engage the pin during a first upward deflector translation so that the pin becomes vertically secured by a first region of the surface, and during a second sequential upward translation so that the pin engages a second region of the surface, wherein vertical translation by the deflector is enabled.

14. The dam as claimed in claim 1, wherein the mechanism for the deflector defines a pivot axis, and the mechanism includes a compound gear system comprising an engaging pin and configured to increase the angle of rotation of the pin relative to the pivot axis, and a swing arm configured to selectively engage the pin so as to prevent rotation in one direction in an engaged position.

15. The dam as claimed in claim 1, wherein the deflector defines a pivot axis, and the mechanism includes a pawl and ratchet concentrically aligned with the axis, and the pawl is biased towards engaging the ratchet, so as to prevent rotation in one direction, and includes a disengagement actuator configured to cause the pawl to selectively disengage the ratchet so as to allow rotation in said one direction.

16. The dam as claimed in claim 15, wherein the disengagement actuator comprises an active material element.

\* \* \* \* \*